United States Patent [19]
Gomez et al.

[11] Patent Number: 5,835,064
[45] Date of Patent: Nov. 10, 1998

[54] ANTENNA ADAPTER ASSEMBLY FOR PORTABLE CELLULAR TELEPHONE

[75] Inventors: Francisco X. Gomez, Melrose Park; Ronald Langenberg, Arlington Heights; Xin Du, Bartlett, all of Ill.

[73] Assignee: Andrew Corporation, Addison, Ill.

[21] Appl. No.: 604,710

[22] Filed: Feb. 21, 1996

[51] Int. Cl.⁶ .................................................. H01Q 1/24
[52] U.S. Cl. ............................ 343/702; 343/906; 455/90
[58] Field of Search .................... 343/702, 906, 343/916, 900; 455/129, 90, 349; 439/916; H01Q 1/24

[56] References Cited

U.S. PATENT DOCUMENTS

| | | |
|---|---|---|
| 3,917,372 | 11/1975 | Selinko . |
| 3,946,390 | 11/1976 | Alexander et al. . |
| 4,050,767 | 9/1977 | Berning . |
| 4,611,213 | 9/1986 | Johnson et al. ...................... 343/702 |
| 4,761,823 | 8/1988 | Fier . |
| 4,867,698 | 9/1989 | Griffiths . |
| 5,233,363 | 8/1993 | Yarsunas et al. .................... 343/906 |
| 5,276,454 | 1/1994 | Gonzalez et al. ................... 343/702 |
| 5,278,570 | 1/1994 | Jaramillo et al. . |
| 5,440,315 | 8/1995 | Wright et al. ....................... 343/906 |
| 5,524,284 | 6/1996 | Marcou et al. ..................... 343/702 |
| 5,551,080 | 8/1996 | Chambers et al. .................. 343/702 |

*Primary Examiner*—Hoanganh T. Le
*Assistant Examiner*—Tho Phan
*Attorney, Agent, or Firm*—Lockwood Alex FitzGibbon & Cummings

[57] ABSTRACT

An adapter assembly is provided for adapting a portable cellular telephone to receive an external replacement antenna or an external direct feed connection by replacing the internal antenna connection of the cellular telephone. The adapter assembly includes a body portion with an antenna-receiving bore, a telephone chassis contact portion at the other end a circuit board interposed between the body and contact portion which spaces them apart and interconnects them together. The circuit board has circuitry thereon which transposes the connections effected thereby between coaxial conductors of the assembly body and contact portions.

26 Claims, 3 Drawing Sheets

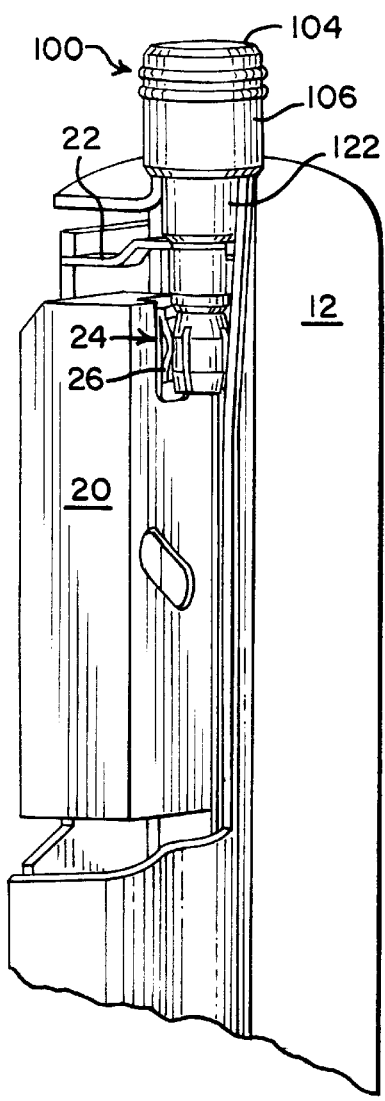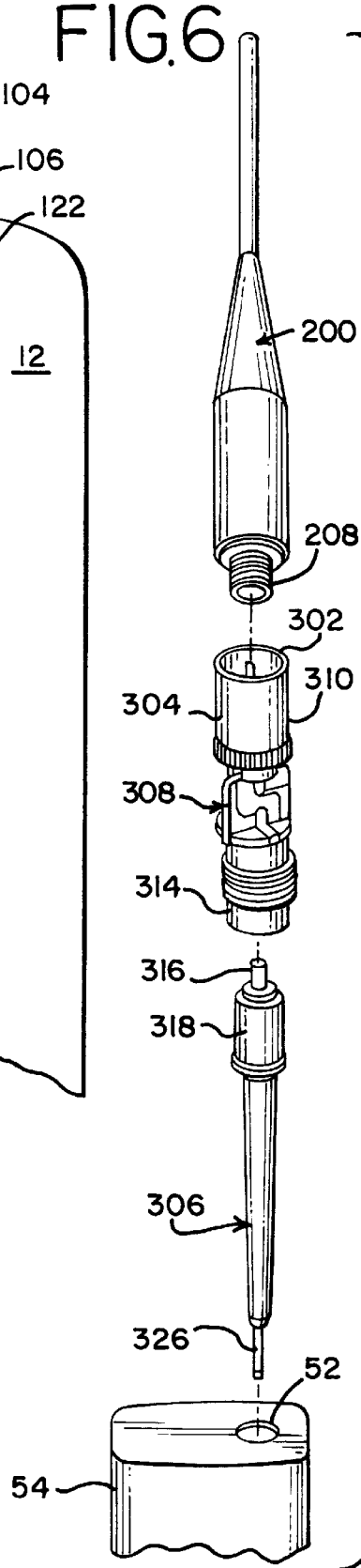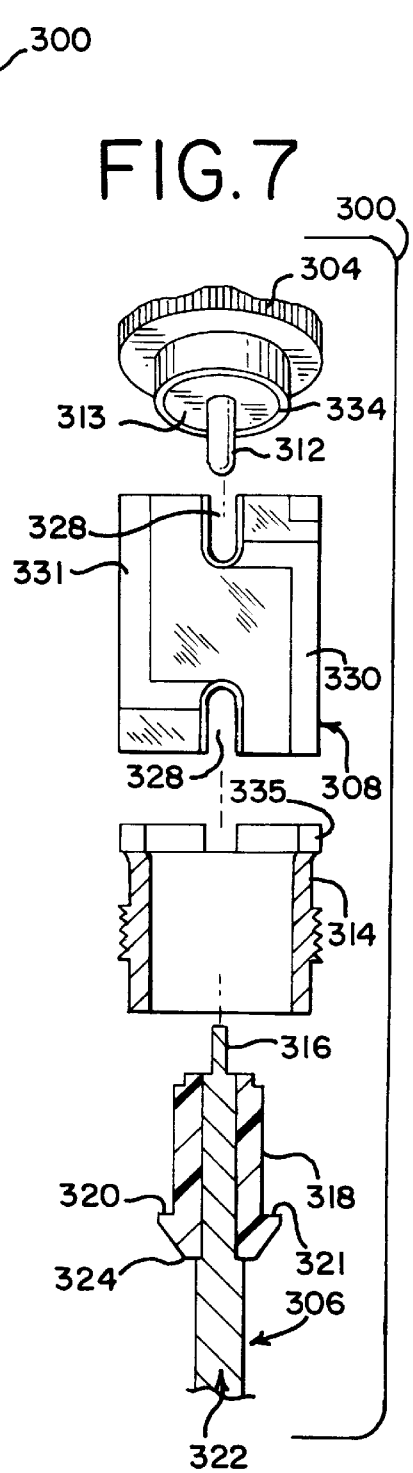

FIG. 8
FIG. 9
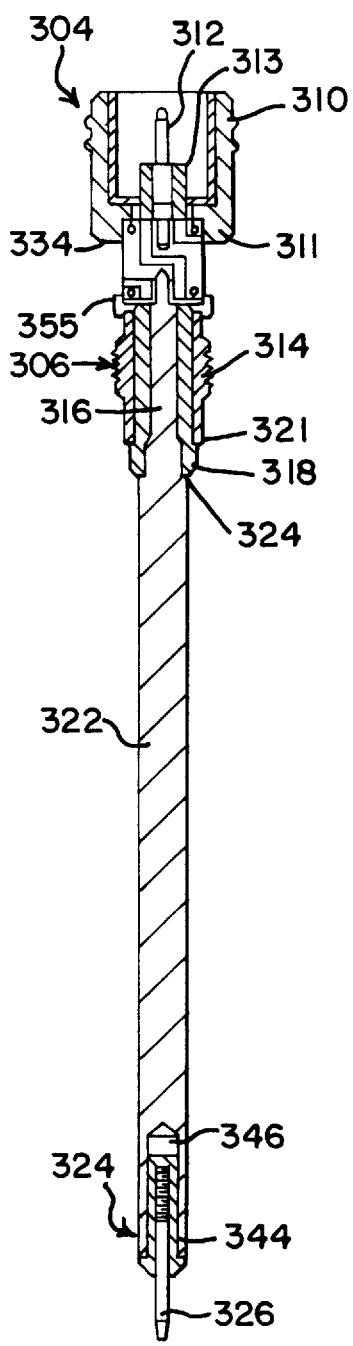
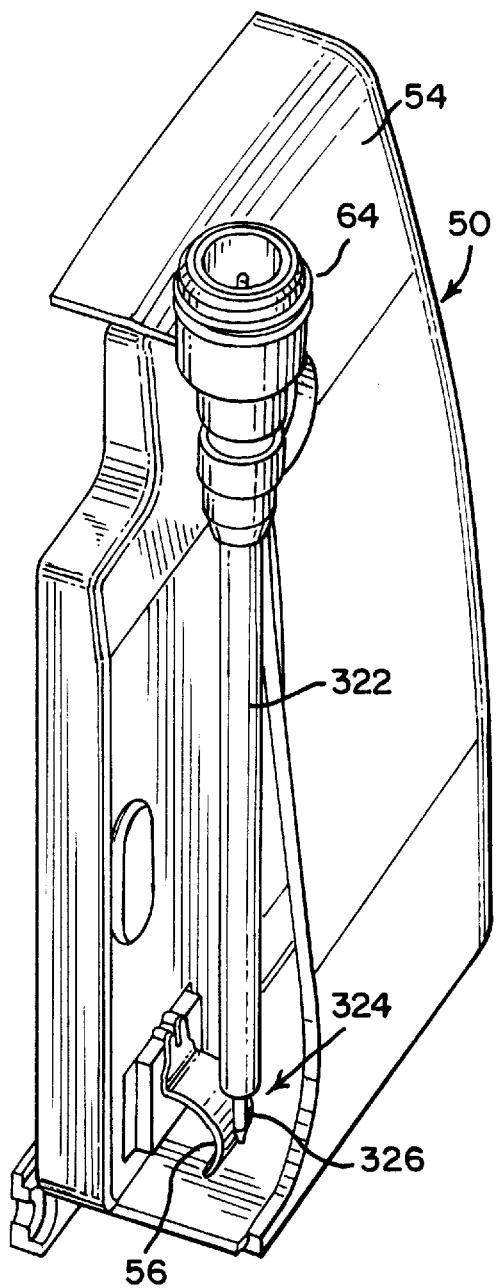

ANTENNA ADAPTER ASSEMBLY FOR PORTABLE CELLULAR TELEPHONE

BACKGROUND AND SUMMARY OF THE INVENTION

The present invention relates generally to portable cellular telephones, and more particularly, to an adapter assembly for a portable cellular telephone which permits the cellular telephone to receive a connection from either a replacement antenna or a direct feed connection from an external antenna.

Portable cellular telephones have fallen in price over the past years and this decrease has resulted in a large increase in their affordability. Although the technology incorporated into these telephones has increased, many models of handheld portable cellular telephones are manufactured by their original equipment manufacturer (OEM) with an internal antenna already attached to the telephone. These antennas typically utilize a retractable design.

These OEM antennas supplied with such handheld cellular telephones perform optimally when the cellular telephone is operated in an open air environment. However, once the cellular telephone is moved by the user inside a building or vehicle, the radio frequency (RF) energy which enables communications between the cellular telephone and the public telephone switching network is compromised because of the physical structure of the building or vehicle, which presents interference to the antenna RF energy.

RF energy, as is known in the art, has a very low penetration of metallic structures and substrates, such as vehicle body panels or building columns and masonry walls. Thus, it is not uncommon for portable cellular telephone users to experience reduced RF performance when they operate their handheld cellular telephone inside buildings or vehicles. However, cellular telephones which are permanently mounted in vehicles do not encounter this type of interference because they utilize a direct feed connection to an external antenna mounted to the exterior of the vehicle.

These external antennas' direct feed connections typically enter the vehicle through a window or a body panel thereof and connect to the handheld cellular telephone. This type of antenna connection improves the performance of the handheld cellular telephone. Additionally, such a connection potentially reduces the possible detrimental effects of RF energy emanating from portable cellular telephone antennas which have been alleged to cause increase risk of brain cancers and the like by moving the cellular telephone antenna to the exterior of the vehicle, away from the head of the user.

However, a number of models of handheld cellular telephones do not have antenna connections which may effectively and easily connect with either a replacement antenna element or a direct feed cable leading to an external antenna.

The present invention is therefore directed to an antenna adapter assembly which enables a user to easily utilize a direct feed antenna connection or a replacement antenna with a portable cellular telephone by replacing the OEM antenna and its connection to the internal telephone chassis. The present invention provides advantages to a portable cellular telephone user in that it permits the user to easily replace the OEM antenna, should it become broken. Moreover, the user may also improve the performance of his telephone by substituting a replacement antenna with improved performance characteristics as compared to the OEM antenna. The user may still further connect his portable cellular telephone to an external antenna by way of a direct feed connection.

The antenna adapter assembly of the present invention replaces the existing antenna and easily permits portable cellular telephone to utilize multiple designs and styles of replacement antennas. The present invention is specifically directed to two style of portable cellular telephones, namely the NOKIA and NEC brands.

At least two antenna adapters are known in the art. One adapter for use with handheld cellular telephones manufactured by NOKIA utilizes a bulky transformer and telephone receptacle which must be mounted to the interior of the vehicle. Such a system is bulky and expensive.

Another adapter apparatus is described and claimed in U.S. Pat. No. 5,524,284 issued Jun. 4, 1996, and assigned to the assignee of the present application. This adapter apparatus utilizes a flexible engagement tab to engage the internal telephone chassis and further utilizes a locking cap which fixes the engagement tab into a locked position upon the cellular telephone. Although effective, this adapter apparatus is utilizable only on portable cellular telephones of the Motorola Micro-Tac design and similar "flip-style" cellular telephones.

Heretofore, no antenna adapter assembly has been known in the art which replaces the internal antenna connection of a handheld cellular telephone to permit replacement of the antenna without a cap-style locking mechanism.

The present invention is therefore directed to an antenna adapter assembly which is intended for use on NOKIA and NEC and other similar style handheld cellular telephones. The present invention replaces the OEM antenna supplied with these type cellular telephones and permits a variety of replacement antennas to be used with these cellular telephones.

The present invention accomplishes this by way of an adapter assembly which has a cylindrical body portion which defines an external antenna connection receptacle and which is adapted to receive either a replacement external antenna or a direct feed connection to an external antenna. The adapter assembly further includes a telephone chassis contact portion aligned with the body portion and which is received within the telephone body. The adapter assembly still further includes means for establishing an electrical connection with the antenna circuitry of the telephone chassis. The adapter assembly body and contact portions are spaced apart and may be interconnected by a printed circuit board assembly. This circuit board may include an impedance matching network in order to match the impedance of the internal telephone circuitry to that of the replacement antenna or direct feed connection.

In one principal aspect of the present invention, the printed circuit board interconnecting the adapter assembly body and contact portions includes circuitry which effectively transposes the hot and ground leads between the telephone chassis and the external antenna by way of a circuit which interconnects the coaxial conductors of the adapter assembly body and contact portions such that the central conductor of one of the portions is connected to the outer conductor of the other portion and vice-versa.

In one embodiment of the present invention and in fulfillment of the principal aspect described above, the adapter assembly contact portion has a central conductor extending therefrom which is received within an opening of the printed circuit board to provide a connection between one of the inner and outer coaxial conductors of the adapter contact portion and a circuit trace on the circuit board.

In another embodiment of the present invention and in another principal aspect of the present invention, the adapter assembly contacts the hot lead of the telephone circuit but has a ground lead which is spaced apart from the antenna ground circuit of the telephone, thereby establishing a "virtual" ground in which an open circuit is used for the transmission of RF energy through the antenna.

Accordingly, it is a general object of the present invention to provide an assembly for adapting a portable handheld cellular telephone to receive a replacement antenna or external antenna direct feed connection.

Another object of the present invention is to provide an adapter assembly for a handheld cellular telephone of the type having an opening in a housing portion of the telephone through which its OEM antenna extends, wherein the adapter assembly includes means for engaging the telephone and registering the adapter in place within the telephone housing portion, means for engaging an antenna circuit within the telephone housing portion and the adapter assembly, and means for effectively transposing the ground circuitry between the telephone and the replacement antenna.

Yet another object of the present invention is to provide an antenna adapter assembly for a handheld cellular telephone which replaces the OEM antenna supplied with the telephone and adapts the telephone for use with a replacement or external antenna, in which the antenna adapter assembly includes a SMA receptacle for receiving the replacement or external antenna and an engagement member which engages the telephone antenna circuitry, the adapter assembly further having means for transposing the "hot" and "ground" leads of the antenna circuitry.

It is still another object of the present invention to provide an adapter assembly for a portable handheld cellular telephone of the NOKIA or NEC style which replaces the telephone OEM antenna and which adapts the cellular telephone for utilization of a replacement antenna or a direct feed connection from an external antenna, the assembly being adapted to partially fit within an antenna opening of the cellular telephone housing, the adapter assembly including an antenna-receiving receptacle having means for establishing an electrical connection with a replacement antenna or external antenna direct feed connection and a contact assembly for contacting the antenna circuitry of the telephone and establishing an electrical connection therewith, the antenna-receiving receptacle and contact assembly being interconnected by a transposition circuit which transposes the hot and ground leads between the antenna-receiving receptacle and contact assembly, the contact assembly having means establishing a virtual ground for the antenna circuit.

These and other objects, features and advantages of the present invention will become apparent from the following detailed description, taken in conjunction with the accompanying drawings, wherein like reference numerals refer to like parts.

BRIEF DESCRIPTION OF THE DRAWINGS

In the course of this detailed description, reference will be made to the attached drawings in which:

FIG. 5 is a partial sectional view of the rear portion of the cellular telephone of FIG. 2 showing the antenna adapter assembly of FIG. 3 in place within the cellular telephone housing portion;

FIG. 6 is an exploded perspective view of a second embodiment of an antenna adapter assembly of the present invention particularly suitable for use on handheld cellular telephones of the NEC style;

FIG. 7 is a enlarged exploded view, partially in section illustrating certain of the components of the antenna adapter assembly of FIG. 6;

FIG. 8 is a sectional view of the antenna adapter assembly of FIG. 6; and

FIG. 9 is a perspective view, partially in section, of the antenna adapter assembly of FIGS. 6–8 in place within an NEC style cellular telephone housing.

DETAILED DESCRIPTION OF THE INVENTION

Figure 1:
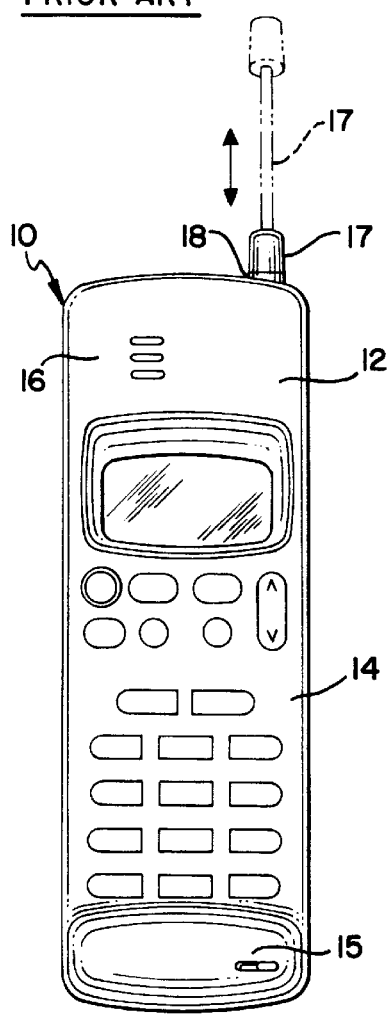
FIG. 1 is an elevational view of a prior art portable handheld cellular telephone of the "NOKIA" style upon which the present invention may be optimally utilized.

FIG. 1 illustrates a portable handheld cellular telephone 10 well-known in the art upon which the present invention may be used. The cellular telephone 10 illustrated is exemplary of the style telephones manufactured by NOKIA of Finland. The telephone 10 has a telephone body, or housing 12, which encloses a telephone chassis (not shown) upon which appropriate telephone circuitry is mounted. As is known in the art, the telephone housing 12 includes a keypad section 14, a speaker 15, an earpiece 16 and a retractable antenna radiating element 17. The antenna radiating element 17 extends through an opening 18 formed in the telephone housing 12 and accommodates the radiating element 17 between a retracted position and an extended position, shown in phantom in FIG. 1.

Figure 2:
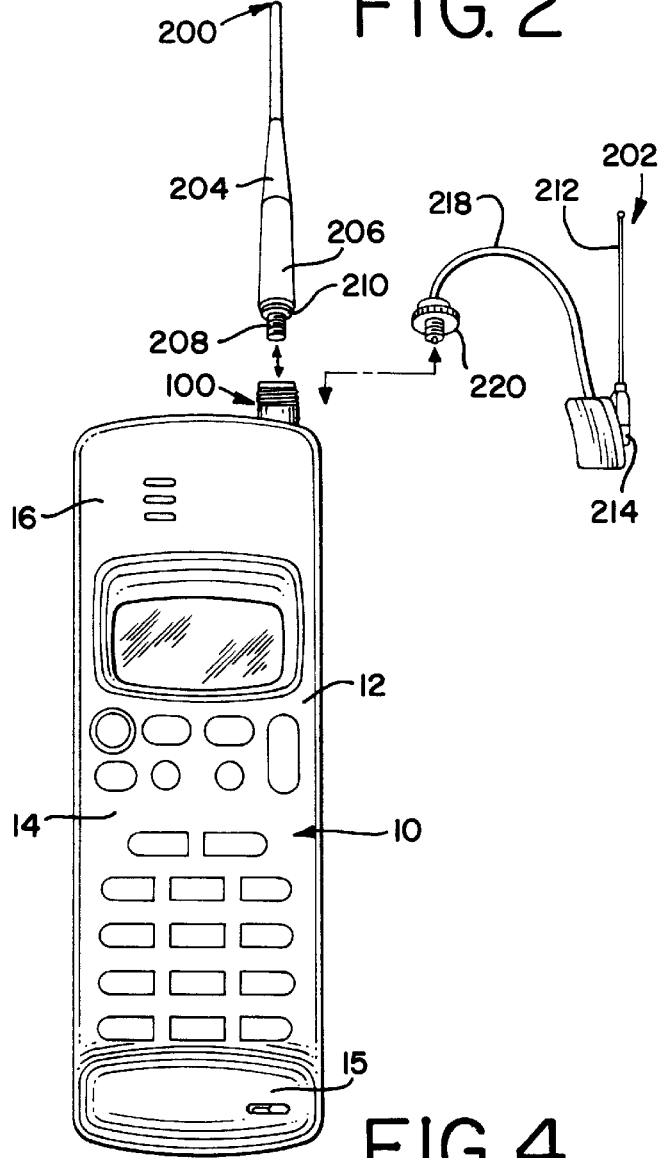
FIG. 2 is the same view as FIG. 1 but illustrating an adapter assembly of the present invention in place in the cellular telephone and further illustrating the types of external antennas which may be utilized with the present invention.

FIG. 2 illustrates the NOKIA-style cellular telephone 10 equipped with an antenna adapter assembly 100 of the present invention which permits the user of the telephone 10 to replace the OEM antenna radiating element 17 supplied with the telephone with a variety of replacement antennas. Two typical styles of replacement antennas 200, 202 are depicted in FIG. 2. One of the replacement antennas 200 includes a quarter-wave spike antenna of the "rubber duck" style in which the antenna radiating element 204 is covered with an exterior protective rubberized coating 206. Such an antenna includes a conventional male threaded coaxial connection 208 disposed at its base portion 210 which is threadedly received within a receptacle of the adapter assembly 100. Other size replacement antennas may be utilized with the invention as well, such as half-wave spike antennas.

Another replacement antenna 202 is illustrated in FIG. 2 and depicts an external antenna apparatus having an antenna radiating element 212 supported on an external mounting assembly 214 by which the antenna 202 may either be permanently or removeably fixed to a vehicle. This external antenna apparatus includes a cable assembly 218 which extends from the antenna mounting assembly 214 and terminates in a direct feed male threaded coaxial connector assembly 220 which extends into the vehicle and which is received in the adapter assembly 100.

Figure 3:
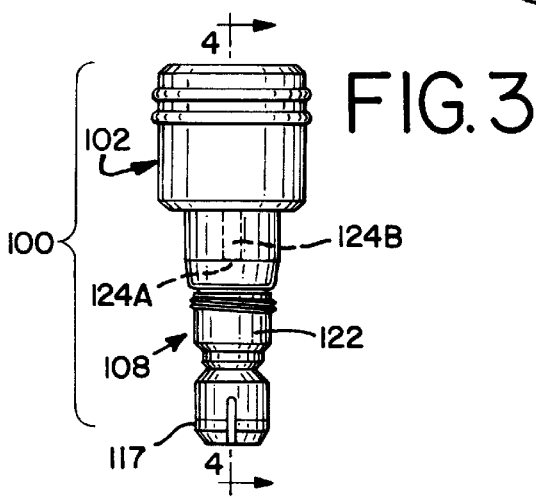
FIG. 3 is an elevational view of one embodiment of an antenna adapter assembly constructed in accordance with the principles of the present invention for use with the cellular telephones illustrated in FIGS. 1 and 2.
Figure 4:
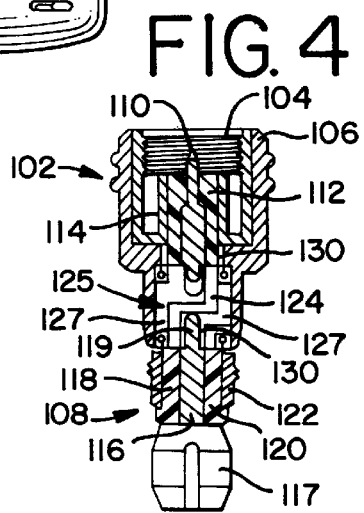
FIG. 4 is a sectional view of the antenna adapter assembly of FIG. 3 taken along lines 4—4 thereof.

Referring now to FIGS. 3–5, a first embodiment of an adapter assembly constructed in accordance with the principles of the present invention is illustrated generally at 100 and has a body portion 102 having a threaded bore 104 which receives the male threaded ends 208, 220 of either a replacement antenna 200 or external antenna 202. The upper part 106 of the body portion 102 typically projects above and out from the surface of the telephone housing 12 so that the threaded bore 104 is easily accessible to a user. The body portion 102 includes a central contact pin 110 in the bore 104 extending upwardly from the base of the bore 104.

The contact pin 110 is held within and preferably surrounded by an insulative bushing 112 which serves to isolate the contact pin 110 from the other connector of the body portion 102, namely, a connector bushing 114 which encircles the insulated bushing 112 and which contacts the body portion 102 at the base of the bore 104 in order to define a coaxial female connection part of the adapter assembly 100 in a manner known in the art.

At its opposite end, the antenna adapter assembly 100 includes a contact portion 108 aligned with and spaced apart from the body portion 102. The contact portion 108 includes a central conductor in the form of a contact rod 116 which has a hollow, slotted base 117 axially aligned with the adapter assembly body portion 102 and an axially extending contact pin 119. This contact rod 116 is also preferably encircled by a bushing 118 formed from a dielectric material, such as Teflon® or Ultem®. The bushing 118 is seated within a recess, or cavity 120, formed in a threaded collar 122 which isolates the rod 116 from the collar 122, thereby forming a coaxial connector within the contact portion 108. The threaded collar 122 is intended to engage an opposing threaded opening of an internal retention plate 22 of the telephone chassis 20.

The body and contact portions 102, 108 are separated from each other, but interconnected together by a circuit board 124 having a connecting circuit 125 disposed thereon. This circuit 125 is illustrated in FIG. 4 as comprising two sets of pairs of circuit traces 127 on opposite surfaces 124A, 124B of the circuit board 124. Preferably, the circuit provides an impedance of a value matching the internal telephone antenna circuitry with that of the replacement or external antennas 200, 202. As seen best in FIG. 4, the circuit board 124 may include one or more openings or slots 130 on opposite ends thereof which receive the opposing contact pins 110, 119 of the adapter assembly body and contact portions 102, 108.

In an important aspect of the present invention, the traces 127 of the circuit 125 are arranged in a manner so as to transposingly connect the conductors of the respective body and contact portions of the adapter assembly 100 together. In this regard, as illustrated best in FIG. 4, the traces 127 interconnect the outer conductor, i.e., the threaded collar 122 of the adapter assembly contact portion 108 with the central conductor, i.e. the contact pin 110, of the adapter assembly body portion 102. This circuit thereby effectively transposes the hot and ground leads of the antenna circuit between the replacement or external antenna and the telephone chassis.

In installation, the OEM antenna 17 is removed from the opening 18 of the telephone housing 12. As best illustrated in FIG. 5, the adapter assembly 100 is then inserted into the opening 18 and rotated in order to engage the threaded collar 122 with an internal threaded retention member 22 of the telephone chassis 20 which serves to register the adapter assembly 100 in place within the telephone housing 12. The axial length of the adapter assembly contact portion 108 is long enough so that when threaded into engagement with the telephone, the contact rod 116 rides on an internal antenna contact 24, shown as a leaf contact 26, which typically defines the "hot" point of connection of the antenna circuit, while the retention plate 22 defines the ground of the telephone connection between antenna circuit and the adapted assembly 100. These leads are transposed by the circuit board 124.

Turning now to FIGS. 6–8, a second embodiment of an antenna adapter assembly 300 is illustrated which is particularly suitable for application with NEC-style telephones. As illustrated in FIG. 6, this adapter assembly 300 is received within an opening 52 formed in the telephone housing 54 of a cellular telephone 50 manufactured by NEC of Japan. The adapter assembly 300 replaces the OEM retractable antenna (not shown) supplied with the cellular telephone 50 and provides a conventional antenna receptacle 302 which is intended to receive an opposing male threaded coaxial connection 208 of a replacement antenna 200.

Similar to the first embodiment described above, the adapter assembly 300 includes a body portion 304, a contact portion 306 and a circuit board 308 interposed therebetween. The body portion 304 includes a hollow member 310 with a central conductor 312 disposed therein and separated therefrom by an insulative insert 313. The contact portion 306 includes a hollow, threaded collar 314 which similarly receives a central conductor 316 therein which is aligned axially within the collar 314 and maintained therein by way of an insulative bushing 318. The bushing 318 is preferably sized for a snug fit within the collar 314 and may include an annular rim 320 formed near one end to provide an engagement seat 321 which abuttingly engages an opposing surface of the collar 314.

The contact portion central conductor 316 preferably comprises an elongated contact rod 322 which may have an annular seat, or rim 324, formed thereon which serves to position the bushing 318 in place thereupon. The contact rod 322 has a length significantly longer than that of the collar 314, which is required, as illustrated in FIGS. 8 and 9, to reach down well within the NEC cellular telephone housing 54 to a position proximate to an antenna contact spring 56. In this regard, the distal end 324 of the contact rod 322 may include a contact pin portion 326, suitably plated with a highly conductive metal, such as gold or copper and which establishes a virtual ground connection as explained below.

The circuit board 308 preferably includes a pair of openings, shown in FIG. 7 as slots 328 formed in opposing edges of the board 308. These slots 328, as seen in FIG. 8, receive the inner, or central conductors 312, 316 of the adapter body and contact portions 304 and 306. Included on the circuit board 308 are traces 330, 331 which form a connecting circuit thereon to transpose and interconnect the central and outer conductors of the adapter body and contact portions.

As with the first embodiment, the circuit board traces 330, 331 (it will be noted that a similar pair of traces are disposed on the opposite surface of the board 308) serve to provide a transpositional connecting path from the body portion outer conductor, i.e., the sidewall 311 of the hollow member 310 with the central conductor 316 of the adapter contact portion 306 and from the body portion central conductor 312 to the outer conductor of the contact portion 306 as defined by the walls of the contact collar 314. In order to promote the contact between the circuit traces 330 and 331 and the outer conductors of the body and contact portions 304, 306, they are preferably provided with notched portions 334, 335, which receive the corners of the board 308 where the traces terminate 330, 331.

The contact portion central conductor 316 which extends into the contact opening 328 of the circuit board 308 is isolated from contact with the antenna ground circuit 57 of the telephone chassis 58. This isolation establishes a virtual connection for the ground lead of the antenna circuit, it being understood that in the NEC-style telephone, the hot lead connection occurs between the threaded collar 314 and a telephone cahssis retention collar 64. The isolation occurs at the distal end 324 of the contact rod 322 where, as seen in FIG. 8, the contact pin portion 326 includes an insulating bushing 344 surrounding it and held in a cavity 346 of the contact rod 322. The length of the contact rod 322 permits it to extend substantially within the telephone housing 54 in order to establish a "virtual" ground connection for the NEC-style adapter assembly 300 which creates an open circuit in the ground portion of the connection which has proven suitable for the transmission of RF energy through the circuit.

It can be seen that the present invention offers a consumer the ability to upgrade his or her portable handheld cellular telephone by adjusting the telephone to be used with high quality, increased reception replacement antennas. The adapter assembly thus provides a replacement kit which may be secured to the telephone quickly and reliably.

While the preferred embodiment of the invention has been shown and described, it will be understood by those skilled in the art that changes or modifications may be made thereto without departing from the true spirit and scope of the invention.

We claim:

1. An assembly for adapting a portable cellular telephone for use with a replacement antenna other than the antenna supplied with the cellular telephone by it original manufacturer, wherein said cellular telephone includes an internal chassis enclosed within a telephone housing, the telephone housing having an opening therein disposed in alignment with an antenna connection present in the telephone chassis, the assembly comprising:

an adapter element having a body portion, which defines a point of connection for the replacement antenna, a chassis engagement portion disposed in alignment with said body portion for engaging the telephone chassis antenna connection and establishing an electrical connection between said adapter element and antenna circuitry present in said telephone chassis, and impedance matching means disposed between and separating said body portion from said chassis engagement portion while providing an electrical connection between them, said body portion including a female coaxial connection having an inner conductor and an outer conductor surrounding the inner conductor and electrically insulated therefrom, the body portion inner and outer conductors being surrounded by a threaded bore forming an antenna-receiving receptacle of said adapter element, said chassis engagement portion including a threaded outer portion for engaging a threaded portion of said telephone and registering said adapter assembly in place within said telephone housing.

2. The assembly as defined in claim 1, wherein said chassis engagement portion includes a coaxial conductor portion having an inner conductor and an outer conductor surrounding the inner conductor thereof and electrically insulated therefrom.

3. The assembly as defined in claim 2, wherein said chassis engagement portion includes a hollow bore.

4. The assembly as defined in claim 2, wherein said chassis engagement portion includes a collar member having a hollow bore which forms a portion of said chassis engagement portion outer conductor, the collar member hollow bore receiving an elongated contact pin which forms said chassis engagement portion inner conductor, the contact pin being surrounded by an insulating material which separates said contact pin from said collar member.

5. The assembly as defined in claim 4, wherein said chassis engagement portion includes a bushing disposed in said hollow bore between said collar member and said contact pin, said bushing being formed from said insulating material and insulating said chassis engagement portion inner and outer conductors.

6. The assembly as defined in claim 4, wherein said collar member has a threaded portion which engages a threaded bore of said telephone housing.

7. The assembly as defined in claim 2, wherein said impedance matching means includes a printed circuit board having at least one opening therein adapted to receive the inner conductor of one of said body and chassis engagement portions therein.

8. The assembly as defined in claim 7, wherein said chassis engagement portion inner conductor extends into said printed circuit board opening and electrically contacts said impedance matching means.

9. The assembly as defined in claim 7, wherein said chassis engagement portion inner conductor has a length substantially greater than said chassis engagement portion and extends into said telephone housing opening without contacting said antenna connection to thereby establish a virtual ground connection between said chassis engagement portion inner conductor and an antenna connection ground of said telephone.

10. The assembly as defined in claim 1, wherein said body portion and chassis engagement portion each includes a coaxial conductor portion having an inner conductor and an outer conductor, the outer conductors surrounding and being insulated from their associated inner conductors, the impedance matching means including means for establishing an electrical connection between said body and chassis engagement portions and transposing respective hot and ground leads of said adapter assembly body and chassis engagement portions by respectively connecting said body portion inner and outer conductors to said chassis engagement portion outer and inner conductors.

11. The assembly as defined in claim 10, wherein said impedance matching means includes a printed circuit board with an impedance circuit disposed thereon.

12. The assembly as defined in claim 10, wherein said impedance matching means includes a circuit board having an impedance circuit disposed thereon and an opening which receives said chassis engagement portion inner conductor, said chassis engagement portion inner conductor electrically contacting said impedance circuit through said opening.

13. The assembly as defined in claim 1, wherein said chassis engagement portion includes a coaxial conductor portion having an inner conductor and an outer conductor surrounding the inner conductor thereof and electrically insulated therefrom, said outer conductor including a hollow collar member and said inner conductor including an elongated contact rod axially disposed within said collar member and extending therefrom and contact rod having a contact tip disposed within a distal end of said contact rod and isolated therefrom.

14. An adapter assembly for providing an external antenna connection to a handheld cellular telephone which has a telephone body portion enclosed within an exterior housing, the telephone body portion including an antenna-receiving bore and internal antenna circuitry, the adapter assembly comprising: an adapter body having an antenna-receiving receptacle formed therein, the receptacle including a coaxial conductor portion having separate inner and outer conductors, the adapter body further having an adapter contact member for contacting the telephone body portion to effect an electrical connection therewith, the adapter contact member including a coaxial conductor portion having separate inner and outer conductors aligned with the adapter body receptacle inner and outer conductors, and means joining said adapter body and said adapter contact member together and transposingly interconnecting said inner and outer conductors thereof, whereby electrical connections are established between: (1) said adapter body receptacle inner conductor and adapter contact member outer conductor and (2) said adapter body receptacle outer conductor and adapter contact member inner conductor.

15. The adapter assembly as defined in claim 14, wherein said adapter body and adapter contact members joining means includes a circuit board interconnecting said inner and outer conductors of said adapter body and adapter contact members.

16. The adapter assembly as defined in claim 15, wherein said circuit board includes an impedance matching circuit.

17. The adapter assembly as defined in claim 15, wherein said circuit board includes at least one contact opening formed therein which receives one of said adapter body and contact member inner conductors therein and at least one circuit trace leading to said contact opening.

18. The adapter assembly as defined in claim 17, wherein said one inner conductor directly contacts said circuit trace of said contact opening.

19. The adapter assembly as defined in claim 17, wherein said contact member inner conductor extends from within said circuit board contact opening for a length substantially greater than that of said adapter body into said telephone body portion and proximate to said telephone internal antenna circuitry to form a virtual ground of said adapter assembly.

20. The adapter assembly as defined in claim 14, wherein said adapter contact member outer conductor includes a collar which engages a portion of said telephone body portion to support said adapter assembly in place on said cellular telephone.

21. The adapter assembly as defined in claim 20, wherein said collar includes an axial cavity, the cavity containing an insulating bushing, the bushing including a contact pin extending axially therethrough, said contact pin serving as said adapter contact member inner conductor.

22. The adapter assembly as defined in claim 21, wherein said contact pin has a length greater than said collar and extends past said collar.

23. A kit of parts for use with a portable cellular telephone having a retractable antenna supplied by its original equipment manufacturer, wherein said cellular telephone includes an internal chassis enclosed within a telephone housing, the telephone housing having an opening therein disposed in alignment with an antenna connection present in the telephone chassis, the kit of parts being for converting said cellular telephone into a cellular telephone with a new antenna connection assembly adapted to receive a replacement antenna other than said antenna supplied with said cellular telephone by said original manufacturer, said kit of parts comprising:

an adapter element having a body portion, which defines a point of connection for the replacement antenna, a chassis engagement portion disposed in alignment with said body portion for engaging the telephone chassis antenna connection and establishing an electrical connection between said adapter element and antenna circuitry present in said telephone chassis, and antenna transposition circuit means for electrically connecting said body portion to said chassis engagement portion while transposing the hot and ground leads of said adapter assembly with the hot and ground leads of said cellular telephone.

24. An assembly for adapting a portable cellular telephone for use with a replacement antenna other than the antenna supplied with the cellular telephone by it original manufacturer, wherein said cellular telephone includes an internal chassis enclosed within a telephone housing, the telephone housing having an opening therein disposed in alignment with an antenna connection present in the telephone chassis, the assembly comprising:

an adapter element having a body portion which defines a point of connection for the replacement antenna, a chassis engagement portion having a threaded outer portion for engaging a threaded portion of the telephone chassis antenna connection and establishing an electrical connection between said adapter element and antenna circuitry present in said telephone chassis, and impedance matching means disposed between and separating said body portion from said chassis engagement portion while providing an electrical connection between them, wherein said body portion includes a female coaxial connection having an inner conductor and an outer conductor surrounding the inner conductor and electrically insulated therefrom, and said chassis engagement portion includes a coaxial conductor portion having an inner conductor and an outer conductor surrounding the inner conductor and insulated therefrom, said body portion including a threaded portion that defines an antenna-receiving receptacle of said adapter assembly.

25. An assembly for adapting a portable cellular telephone for use with a replacement antenna other than the antenna supplied with the cellular telephone by it original manufacturer, wherein said cellular telephone includes an internal chassis enclosed within a telephone housing, the telephone housing having an opening therein disposed in alignment with an antenna connection present in the telephone chassis, the assembly comprising:

an adapter element having a body portion, the adapter element body portion including a connection for engaging the replacement antenna, said adapter element further having a chassis engagement portion disposed in alignment with said adapter element body portion for engaging the telephone chassis antenna connection and establishing a conductive path between said adapter element and antenna circuitry present in said telephone chassis, impedance matching means disposed between said chassis engagement portion and said adapter element replacement antenna connection while providing a conductive path between them, and the impedance matching means including means for transposing respective hot and ground leads of said adapter element replacement antenna connection and said chassis engagement portion.

26. An assembly for adapting a portable cellular telephone for use with a replacement antenna other than the antenna supplied with the cellular telephone by it original manufacturer, wherein said cellular telephone includes an internal chassis enclosed within a telephone housing, the telephone housing having an opening therein disposed in alignment with an antenna connection present in the telephone chassis, the assembly comprising:

an adapter element having a body portion, which defines a point of connection for the replacement antenna, a chassis engagement portion disposed in alignment with said body portion for engaging the telephone chassis antenna connection and establishing an electrical connection between said adapter element and antenna circuitry present in said telephone chassis, the chassis engagement portion including a coaxial conductor portion having an inner conductor and an outer conductor surrounding the inner conductor and electrically insulated therefrom, said assembly further including impedance matching means disposed between and separating said body portion from said chassis engagement portion while providing an electrical connection between them, said body portion including a female coaxial connection having an inner conductor and an outer conductor surrounding the inner conductor and electrically insulated therefrom, the body portion inner and outer conductors being surrounded by a threaded bore forming an antenna-receiving receptacle of said adapter element and said impedance matching means including a printed circuit board having an opening therein adapted to receive an inner conductor of one of said body and chassis engagement portions therein.

* * * * *